United States Patent [19]
Miesterfeld et al.

[11] Patent Number: 4,739,324
[45] Date of Patent: Apr. 19, 1988

[54] METHOD FOR SERIAL PERIPHERAL INTERFACE (SPI) IN A SERIAL DATA BUS

[75] Inventors: Frederick O. R. Miesterfeld, Troy; John M. McCambridge, Northville; Ronald E. Fassnacht, Rochester; Jerry M. Nasiadka, Warren, all of Mich.

[73] Assignee: Chrysler Motors Corporation, Highland Park, Mich.

[21] Appl. No.: 866,630

[22] Filed: May 22, 1986

[51] Int. Cl.$^4$ .......................... H04Q 9/00; H04J 6/00
[52] U.S. Cl. .................................... 340/825.5; 370/85
[58] Field of Search .......................... 340/825.5, 825.57; 370/85

[56] References Cited

U.S. PATENT DOCUMENTS

| | | | |
|---|---|---|---|
| 4,281,380 | 7/1981 | Demesa, III et al. | 370/94 |
| 4,409,592 | 10/1983 | Hunt | 340/825.5 |
| 4,429,384 | 1/1984 | Kaplinsky | 370/85 |
| 4,434,421 | 2/1984 | Baker et al. | 340/825.51 |
| 4,470,110 | 9/1984 | Chiarottino et al. | 370/85 |
| 4,472,712 | 9/1984 | Ault et al. | 340/825.5 |
| 4,584,575 | 4/1986 | Ryckeboer | 340/825.5 |
| 4,628,311 | 12/1986 | Milling | 340/825.5 |

OTHER PUBLICATIONS

IEEE Publication, "Automotive Applications of Microprocessors", 1984; paper No. CH2072-7/84/00-00-0083, A Data Link for Agriculture and off Highway Communications, by Boyd Nichols, Vijay Dharia and Kanaparty Rao.

SAE Information Report, "J1567 Collision Detection Serial Data Communications Multiplex Bus", Fredrick O. R. Miesterfeld, May 23, 1986.

A. Bozzini et al, "Serial Bus Structures for Automotive Applications", *SAE Technical Paper Series*, 830536, Feb. 28–Mar. 4, 1983.

F. Miestefeld, "Chrysler Collison Detection (C$^2$D)-A Revolutionary Vehicle Network", *SAE Technical Paper Series*, 860389, Feb. 24–28, 1986.

F. Phail et al, "In Vehicle Networking-Serial Communication Requirements and Directions", *SAE Technical Paper Series*, 860390, Feb. 24–28, 1986.

R. Mitchell, "A Small Area Network for Cars", 840317, *SAE Technical Paper Series*, 1984.

Primary Examiner—Donald J. Yusko
Attorney, Agent, or Firm—Mark P. Calcaterra

[57] ABSTRACT

In a communication system for the transmission of messages through a data bus between one or more user microprocessors coupled to the data bus, the user microprocessors having either a serial communications interface (SCI) port or a serial peripheral interface (SPI) port along with a clock port and an input/output port, the user microprocessors being coupled to the data bus by a bus interface integrated circuit, a method to transmit and receive data in an SPI mode of operation in conjunction with a method of arbitrating data on the data bus.

2 Claims, 4 Drawing Sheets

METHOD FOR SERIAL PERIPHERAL INTERFACE (SPI) IN A SERIAL DATA BUS

BACKGROUND OF THE INVENTION

1. Field of the Invention

The purpose of the disclosed method for serial peripheral interface (SPI) in a serial data bus is to provide a method of handling an SPI port as part of the serial data bus interface IC circuit described herein.

2. Description of the Prior Art

Data communications between microprocessors or microcomputers need to communicate with each other in many applications.

Local area networks (LAN) link such microprocessors or microcomputers, allowing one of the microcomputers to seize control of the serial data channel commonly linked to all other microprocessors on the LAN and transmit data to any other unit. The protocols, controllers and software needed in a LAN are very complex, especially in large systems.

An automotive environment is a smaller application and, thus, does not require the complex performance capabilities available in a LAN.

Digital data buses have been designed to handle the above-described data communications link in a small area. Such a system is described in SAE Paper No. 840317, by Ronald L. Mitchell entitled "A Small Area Network For Cars." This document is hereby expressly incorporated by reference. Also descriptive of such a digital data bus is U.S. Pat. No. 4,429,384 to Kaplinsky entitled "Communication System Having An Information Bus And Circuits Therefor."

Also descriptive of developments in this field is SAE Paper No. 860390 by Frederick H. Phail and David J. Arnett entitled "In Vehicle Networking - Serial Communications Requirements and Directions." This document is also hereby expressly incorporated by reference.

The subject invention differs from the art noted above by use of a constant speed, the lack of use of an acknowledgement bit and the lack of requirements for a tight link between the transmitting station and the receiving stations. Also important in the subject invention is the communication link between the message transmitter and receiver.

Generally, the following U.S. patents discuss collision detection in data communications systems: U.S. Pat. No. 4,281,380 of DeMesa III et al. entitled "Bus Collision Avoidance System For Distributed Network Data Processing Communications System" dated July 28, 1981; U.S. Pat. No. 4,409,592 of V. Bruce Hunt entitled "Multipoint Packet Data Communication System Using Random Access And Collision Detection Techniques" dated Oct. 11, 1983; U.S. Pat. No. 4,434,421 of Baker et al. entitled "Method For Digital Data Transmission With Bit-Echoed Arbitration" dated Feb. 28, 1984; U.S. Pat. No. 4,470,110 of Chiarottino et al. entitled "System For Distributed Priority Arbitration Among Several Processing Units Competing For Access To A Common Data Channel" dated Sept. 4, 1984; and U.S. Pat. No. 4,472,712 of Ault et al. entitled "Multipoint Data Communication System With Local Arbitration" dated Sept. 18, 1984.

The U.S. Pat. No. 4,434,421 patent to Baker et al. deals with a method to reduce the number of collisions. This is done by reducing the number of slave stations attempting bus access until there is one master and one slave station in communication. This differs from the subject invention in that a broadcast method is employed whereby several users can receive the same message.

The U.S. Pat. No. 4,470,110 to Chiarottino et al. discloses a system to exchange messages including an interface. In addition, U.S. Pat. No. 4,470,110 assigns a priority to an address bit of a particular logical level.

Also of interest is an article in an IEEE publication "Automotive Applications of Microprocessors," 1984; Paper No. CH2072-7/84/0000-0083 entitled "A Data Link For Agricultural And Off Highway Communications" by Boyd Nichols, Vijay Dharia and Kanaparty Rao.

Of paramount importance in the subject invention is the inclusion of the capability to communicate with a serial communication interface (SCI) port, a serial peripheral interface (SPI) port and a buffered serial peripheral interface (BSPI) port.

SUMMARY OF THE INVENTION

The purpose of the serial data bus system disclosed herein, also known as Chrysler Collision Detection ($C^2D$) bus, is to allow multiple microprocessors to easily communicate with each other over a common pair of wires or bus using a scheme similar to a telephone party line. All microprocessors connected to the bus are able to receive all messages transmitted on the bus. Any microprocessor with a message to transmit on the bus waits until any current user is finished before attempting to use it.

Whenever the bus is available, its use is allocated on a first-come first-serve basis. That is, whichever microprocessor begins transmitting its message on the bus, after any previous message finishes, gets the use of the bus. If, however, multiple microprocessors attempt to begin transmitting their messages on the bus at exactly the same time, then the message with the highest priority wins the use of the bus. All messages have unique message priority values and each message is transmitted by only one microprocessor.

The invention disclosed herein is further summarized in two co-pending patent applications on related material. Both applications were filed in the U.S. Patent & Trademark Office on Feb. 24, 1986, and are commonly owned with the subject patent application. They are: "Serial Data Bus For Intermodule Data Communications," U.S. Ser. No. 06/832,908; and "Method Of Data Arbitration and Collision Detection On A Data Bus," U.S. Ser. No. 06/832,909. Both of these applications are hereby expressly incorporated by reference.

Also hereby incorporated by reference is SAE Information Report entitled "J1567 Collision Detection Serial Data Communications Multiplex Bus" to be presented to the SAE Multiplexing Committee on May 23, 1986.

Attention is invited to the above-described applications for further explanation of the summaries of some of the basics of the invention described in the subject application.

It is an object of the subject invention to provide an SCI port, an SPI port and a buffered SPI port as part of the serial data interface integrated circuit described herein. This allows communication with any device configured with any one of these three ports all on the same bus. The inclusion of the ports augments the simplification of the serial data communication described in the previously filed patent applications on the related subject matter.

DESCRIPTION OF THE DRAWINGS

Other objects, features and advantages of the present invention will become more fully apparent from the detailed description of the preferred embodiment, the appended claims and the accompanying drawings in which:

DETAILED DESCRIPTION OF THE PREFERRED EMBODIMENT

This application is one of three filed on the same day and having related specifications and drawings. The other cases are commonly owned with the same inventors are Ser. Nos. 06/866628 and 06/866629 and are entitled "Method For Serial Peripheral Interface In A Serial Data Bus" and "Method For A Buffered Serial Peripheral Interface In A Serial Data Bus." Both of these cases are hereby expressly incorporated by reference.

Further documents hereby expressly incorporated by reference include U.S. Pat. No. 4,429,384 issued to Kaplinsky and entitled "Communication System Having An Information Bus And Circuits Therefor"; SAE Technical Paper No. 830536 entitled "Serial Bus Structures For Automotive Applications" by Anthony J. Bozzini and Alex Goldberger dated Feb. 28, 1983; SAE Paper No. 840317 by Ronald L. Mitchell entitled "A Small Area Network For Cars"; SAE Paper No. 860390 by Frederick H. Phail and David J. Arnett entitled "In-Vehicle Networking - Serial Data Communication Requirements And Directions"; and SAE Paper No. 860389 by Frederick O. R. Miesterfeld entitled "Chrysler Collision Detection ($C^2D$) A Revolutionary Vehicle Network."

Figure 1:
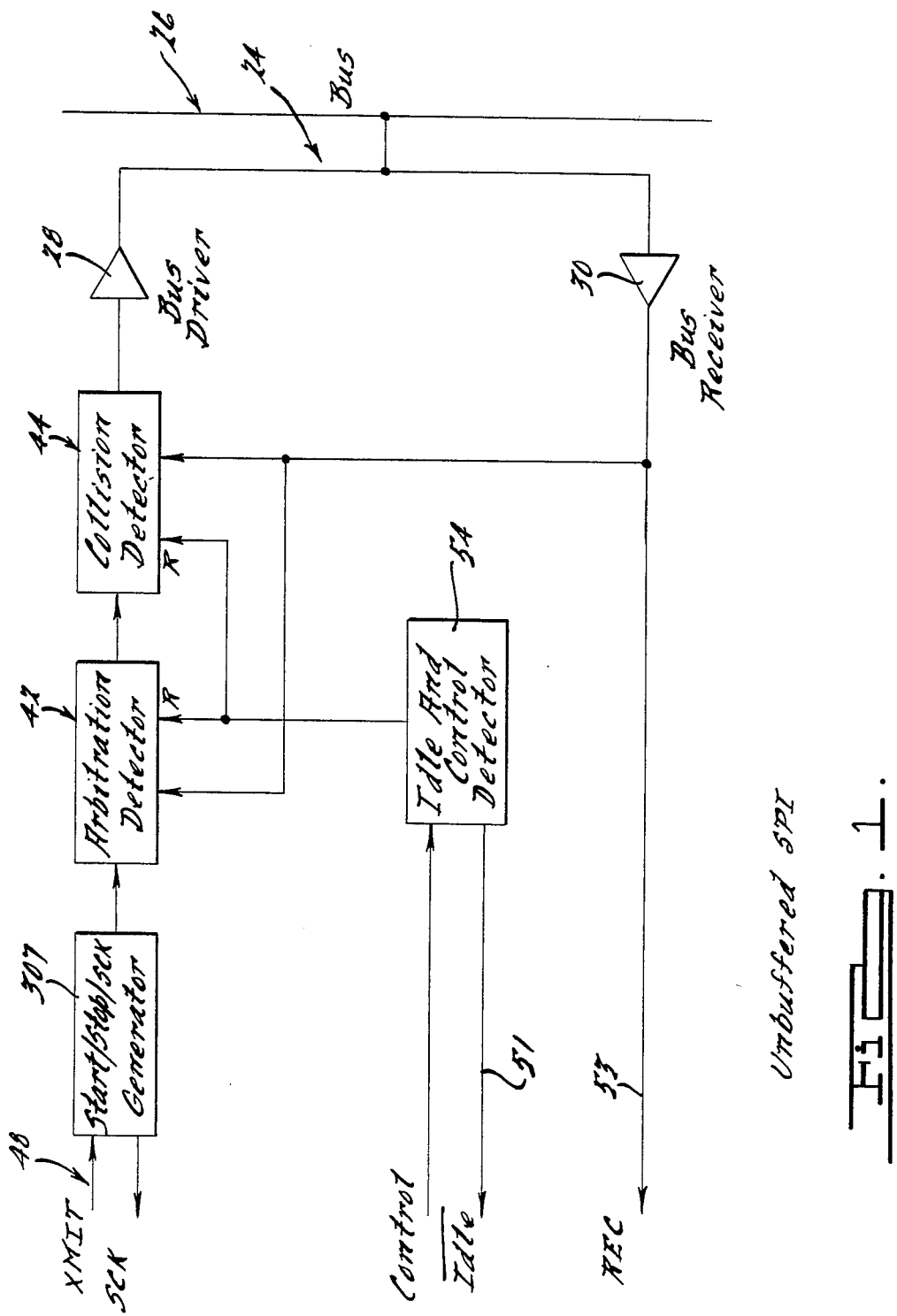
FIG. 1 illustrates in block diagram form hardware used in the SPI mode of a serial data bus interface integrated circuit (IC)
Figure 2:
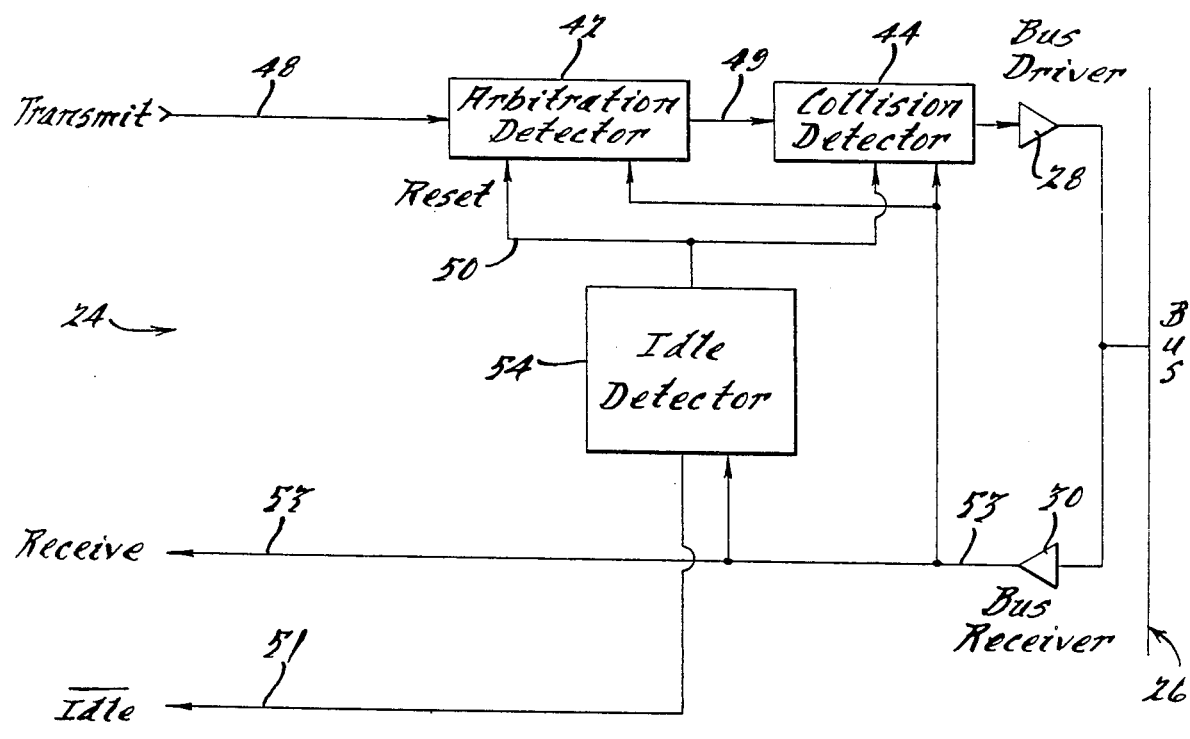
FIG. 2 illustrates another block diagram showing the serial data bus in an SCI mode.

Attention is invited to the previously filed patent applications and the concurrently filed patent applications on the related subject matters for a more complete description of some of the hardware disclosed in FIG. 1 and FIG. 2.

The interaction between the arbitration detector 42, collision detector 44, work counter 202, word flip-flop 203, start bit detector 200, firming air detector 204, idle counter 206, idle flip-flop 207, clock divider 201, digital filter 210, bus driver made up of OR gate 62 and NAND gate 63, along with bus receiver 30 in conjunction with current source 34 and current sink 36 as connected to the bus 26.

An understanding of the above-listed blocks is necessary for understanding the improvements outlined in the subject application. Attention is, therefore, invited to patent applications U.S. Ser. Nos. 06/832,908 and 06/832,909 and the explanations included therein and the drawings which all have been incorporated by reference.

Referring to FIG. 1 and FIG. 2, the hardware of the serial data bus interface IC 24 is shown in two ways. In FIG. 2, the bus interface IC 24 is shown in a serial communications interface (SCI) mode. That is, only the hardware which is used exclusively for SCI and which is common to other modes of operation for the serial data bus, namely SPI and buffered SPI is illustrated.

FIG. 1 augments the diagram of FIG. 2 by adding in the hardware from the bus interface IC 24 which is used in an SPI mode (in an unbuffered condition).

The block diagram of FIG. 2 is adequately described in the documents incorporated by reference and should not be repeated here.

The unbuffered SPI hardware diagram shown in FIG. 1 merely augments the diagram of FIG. 2 with some of the blocks and lines described in other copending patent applications, namely, the start/stop/SCK generator 307 and the SCK and CONTROL lines. Also augmented in this figure is the idle control detector 54 to show that the idle and control detector is comprised of the idle counter 206, idle flip-flop 207 and the scheduler and controller block 309, all described in the co-pending patent application entitled "Serial Data Bus For SCI, SPI and Buffered SPI Modes of Operation."

Figure 3:
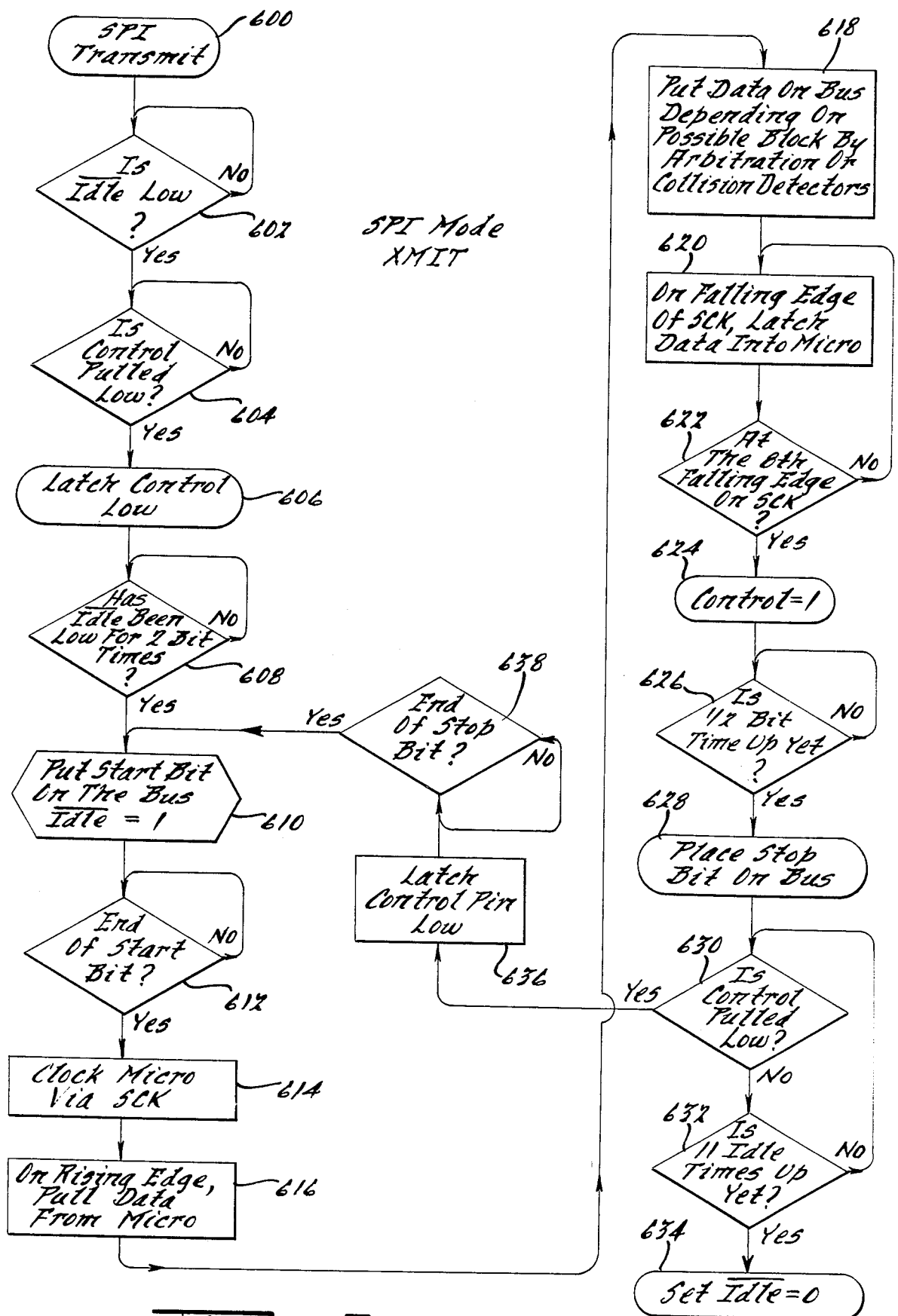
FIG. 3 is a flowchart showing the SPI mode methods under a transmit condition.

Turning now to FIG. 3 and to FIG. 4, the SPI method will be described in its transmit and receive condition. This is the heart of the subject invention.

When SPI transmit condition exists, the serial data bus interface IC 24 will utilize an SPI mode to govern the transmitting of the data. This mode is begun in block 600 and the bus interface IC 24 checks to see if the $\overline{\text{IDLE}}$ line is in a low condition in decision block 602. If the $\overline{\text{IDLE}}$ line is not low, the bus interface IC 24 waits until it is, and then falls through to decision block 604 to check the control line to see if it has been pulled low. If not, the bus interface IC waits until the control line is pulled low and then falls through to block 606 to latch the control line in a low condition.

Next, the bus interface IC checks to see if the $\overline{\text{IDLE}}$ line has been low for two bit times in decision block 608. If not, it waits for that condition to occur and falls through a decision block 610 to put a start bit on the bus 26 and set the $\overline{\text{IDLE}}$ line to a logical one.

Next, the bus interface IC checks for the end of a start bit and waits until the end of a start bit occurs in block 612 before falling through to block 614 to clock the user microprocessor which is not shown in the subject application, but which is shown and illustrated in the co-pending patent applications. The clock of the user microprocessor is done via the SCK line which is also more fully explained in the co-pending patent applications.

Next, the bus interface IC falls through to block 616 and, on the rising edge of the SCK signal, pulls the data from the user microprocessor. Next, the user microprocessor puts the data on the bus 26 depending on the possible blocking operation by the arbitration or collision detectors 42 and 44, respectively. This is done in block 618.

Next, on the falling edge of an SCK signal, the user microprocessor in block 620 latches the data into the user microprocessor and falls through the decision block 622 where it watches for the eighth falling edge on the SCK signal. If the eighth falling edge has not occurred, the method calls for the bus interface IC to return to block 620 to again latch data into the microprocessor. This continues until the eighth falling edge of the SCK signal is observed in decision block 622 at which time the user microprocessor falls through to block 624 to set the control line to a logical one.

Next, the ½ bit time is checked in block 626 and, once it has been reached, the bus interface IC 24 places a stop bit on the bus 26. This is shown in block 628.

In block 630, the bus interface IC 24 checks to see whether the control line has been pulled low. If it has, the bus interface IC 24 returns to the method beginning with block 610, after latching the CONTROL line low in block 636 and waiting for the end of the stop bit in block 638, and puts a start bit on the bus and sets the $\overline{\text{IDLE}}$ line equal to one. If the control line has not been pulled low as checked in block 630, the routine falls through to block 632 to check to see whether eleven idle times have occurred. If not, the decision block 630 is re-entered to recheck the control line.

Once eleven idle times have occurred, the routine falls through to block 634 to set the $\overline{\text{IDLE}}$ line equal to zero, thus terminating the SPI mode transmission.

Figure 4:
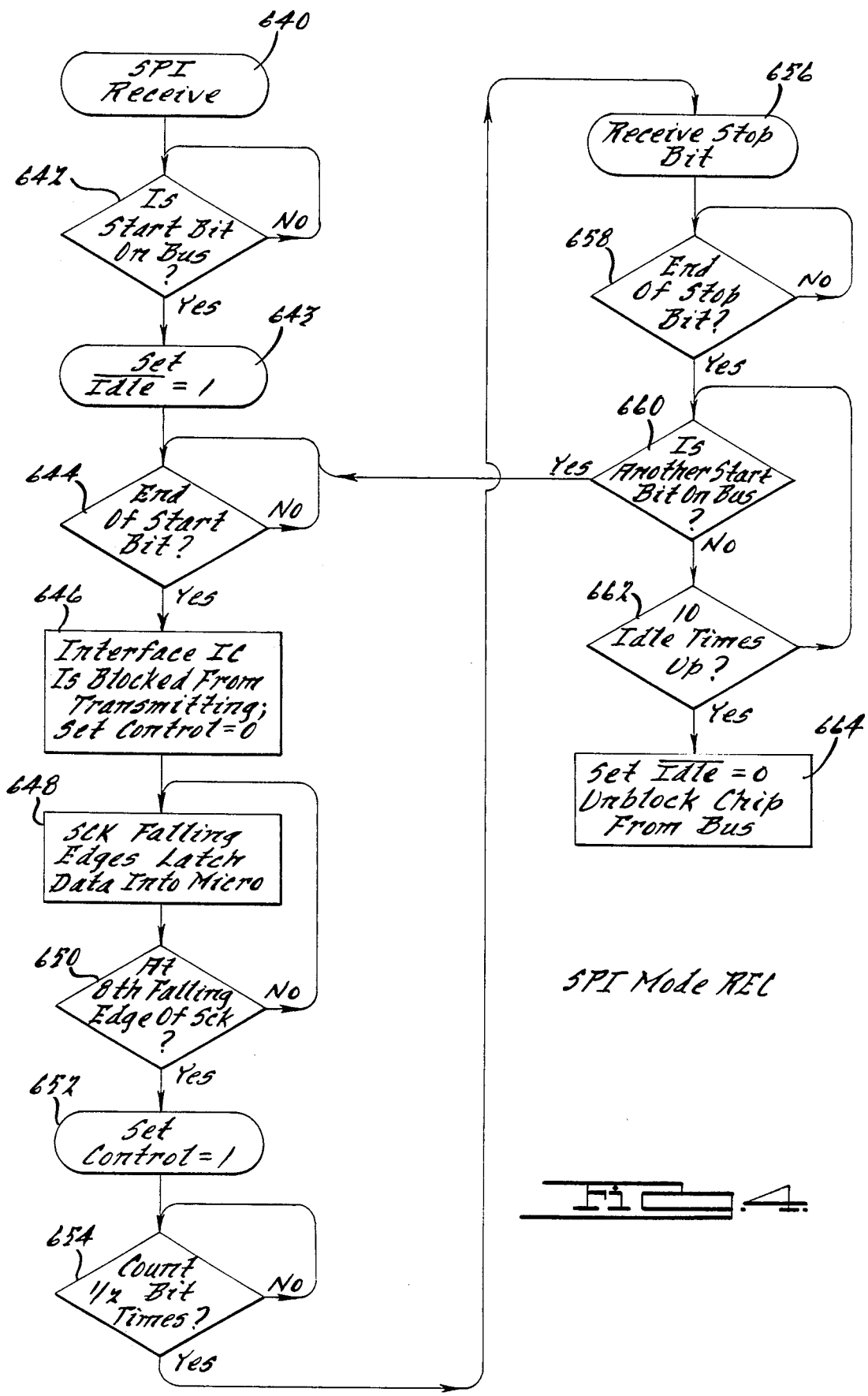
FIG. 4 shows the flowchart of the SPI mode in a receive condition.

Turning now to FIG. 4, the SPI mode is illustrated in a receive condition.

When the bus interface IC 24 is in the SPI mode, it must receive data. The bus interface IC 24 begins in block 640 and falls through to block 642, waiting until a start bit appears on the bus 26 before setting $\overline{\text{IDLE}}=1$ in block 643. The bus interface IC then sets the $\overline{\text{IDLE}}$ line to a logical one.

The user microprocessor then checks in block 644 to watch for the end of the start bit and waits until this occurs before falling through to block 646 to block the bus interface IC from transmitting while setting the control line to a logical zero.

Upon the occurrence of the falling edges of the SCK signal, the user microprocessor in block 648 latches the data into the user microprocessor. The bus interface IC 24 in block 650 looks for the eighth falling edge of the SCK signal and repeats the latching of data into the user microprocessor as called out in block 648 until the eighth falling edge of the SCK signal occurs. At that point, the bus interface IC falls through to block 652 to set the control line to a logical one.

After counting ½ bit times in decision block 64, the user microprocessor falls through to block 656 to receive a stop bit period. Once the end of the stop bit has been observed in block 658, the bus interface IC 24 falls through to block 660 to check to see whether there is another start bit on the bus 26. If there is, the routine returns to block 644 and repeats the above-described procedure. If not, the routine fall through to block 662 to watch for the occurrence of ten idle times. Once this condition occurs, and no other start bit appears on the bus, the routine falls through to block 64 to set the $\overline{\text{IDLE}}$ line to zero thereby unblocking the bus interface IC from accessing the bus 26.

Thus, the SPI mode in the receive condition is terminated.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

We claim:

1. In a communication system for the transmission of messages through a data bus between one or more user microprocessors coupled to the data bus, the user microprocessors having either a serial communications interface (SCI) port or a serial peripheral interface (SPI) port along with a clock port and an input/output port, the user microprocessors being coupled t the data bus by a bus interface integrated circuit, a method of transmitting data in an SP mode of operation comprising:

a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; and checking to see whether the data bus is idle, waiting if it is not;

waiting for the bus to be idle for 2-bit times;

placing a start bit on the data bus;

waiting until the end of the start bit;

closing the user microprocessor;

pulling data from the user microprocessor;

placing the data from the user microprocessor onto the bus depending on a possible block from bit-wise contention and deterministic priority access method utilized by the bus interface IC;

latching the data back into the user microprocessor;

waiting for the eighth falling edge of a clock signal;

waiting for the occurrence of ½ bit time;

placing a stop bit on the data bus;

checking to see whether the user microprocessor wishes to transmit another byte;

if the user microprocessor does not wish to transmit another byte, waiting for the occurrence of eleven idle times, and making another check to see whether the user microprocessor wishes to put more data on the data bus; and if the user microprocessor wishes to transmit another byte, return to repeat the previous steps to transmit the data beginning with the step of checking to see whether the data bus is idle.

2. In a communication system for the transmission of messages through a data bus between one or more microprocessors coupled to the data bus, the user microprocessors having either a serial communications interface (SCI) port or a serial peripheral interface (SPI) port along with a clock port and an input/output port, the user microprocessor being coupled to the data bus by a bus interface integrated circuit, a method of receiving data in an SPI mode of operation comprising:

a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; and watching for a start bit to appear on the data bus;

waiting until the end of the start bit once a start bit appears on the bus;

signaling the bit-wise contention and deterministic priority access method to lock the bus interface IC from transmitting;

latching data into the user microprocessor;

waiting for the eighth falling edge of the clock signal and then counting 2-bit times;

receiving a stop bit on the data bus and waiting for the end of the stop bit to occur;

checking for the occurrence of another start bit on the data bus, repeating the previous steps to latch in more data if another start bit is on the data bus;

waiting ten idle times if there is no other start bit on the data bus and signaling the bit-wise contention and deterministic priority access method to unlock the bus interface IC from transmitting data.

* * * * *